(12) United States Patent
Chu et al.

(10) Patent No.: US 9,317,578 B2
(45) Date of Patent: *Apr. 19, 2016

(54) DECISION TREE INSIGHT DISCOVERY

(71) Applicant: International Business Machines Corporation, Armonk, NY (US)

(72) Inventors: Jane Y. Chu, Chicago, IL (US);
Jing-Yun Shyr, Naperville, IL (US);
Weicai Zhong, Shaanxi (CN)

(73) Assignee: International Business Machines Corporation, Armonk, NY (US)

( * ) Notice: Subject to any disclaimer, the term of this patent is extended or adjusted under 35 U.S.C. 154(b) by 222 days.

This patent is subject to a terminal disclaimer.

(21) Appl. No.: 13/830,679

(22) Filed: Mar. 14, 2013

(65) Prior Publication Data

US 2014/0279775 A1    Sep. 18, 2014

(51) Int. Cl.
*G06N 5/00* (2006.01)
*G06F 17/30* (2006.01)
*G06N 5/02* (2006.01)

(52) U.S. Cl.
CPC .... *G06F 17/30598* (2013.01); *G06F 17/30327* (2013.01); *G06N 5/022* (2013.01)

(58) Field of Classification Search
CPC .................................. G06N 3/08; G06N 3/02
See application file for complete search history.

(56) References Cited

U.S. PATENT DOCUMENTS

| | | | |
|---|---|---|---|
| 7,130,467 B1 | 10/2006 | Bronder et al. | |
| 8,290,882 B2 | 10/2012 | Sharp | |
| 8,306,943 B2 | 11/2012 | Yepremyan et al. | |
| 2004/0037474 A1* | 2/2004 | Happel | 382/280 |
| 2011/0166838 A1* | 7/2011 | Gehrmann et al. | 703/2 |
| 2013/0073490 A1* | 3/2013 | Baughman et al. | 706/13 |

OTHER PUBLICATIONS

Rokach, L and Maimon, O. (2005), "Top-down induction of decision trees classifiers-a survey". IEEE Transactions on Systems, Man, and Cybernetics, Part C, 35 (4): 476-487.
IBM Inc. (2012), "Tree Algorithms", IBM SPSS Statistics 21 Algorithms, 906-940.
Shyr, J., Chu, J. and Han, S. (2011), "Category profiling and unusual category detection based on Estimated Marginal Means (EMMEANS)", In JSM Proceedings, Social Statistics Section, Alexandria, VA: American Statistical Association. 4289-4300.
Agresti, A. (2002), Categorical Data Analysis, Second Edition, Hoboken, NJ: John Wiley & Sons, Inc. (2 pages).

(Continued)

*Primary Examiner* — Stanley K Hill
*Assistant Examiner* — Kalpana Bharadwaj
(74) *Attorney, Agent, or Firm* — Shumaker & Sieffert, P.A.

(57) ABSTRACT

Techniques for presenting insight into classification trees may include performing a grouping analysis to group leaf nodes of a classification tree into a significant group and an insignificant group, performing influential target category analysis to identify one or more influential target categories for the leaf nodes of the classification tree in the significant group, and presenting one or more insights into the classification tree based on the grouping analysis and the influential target category analysis. Techniques for presenting insight into regression trees may include performing a grouping analysis to group leaf nodes of a regression tree into a high group and a low group, performing unusual node detection analysis to detect one or more outlier nodes in the high group and in the low group, and presenting one or more insights into the regression tree based on the grouping analysis and the unusual node detection analysis.

24 Claims, 7 Drawing Sheets

(56) References Cited

OTHER PUBLICATIONS

Office Action from U.S. Appl. No. 14/489,324, dated Feb. 27, 2015, 10 pp.
Response to the Office Action mailed Feb. 27, 2015, from U.S. Appl. No. 14/489,324, filed May 27, 2015, 10 pp.
Final Office Action from U.S. Appl. No. 14/489,324, dated Oct. 8, 2015, 7 pp.
Response to the Office Action mailed Oct. 8, 2015, from U.S. Appl. No. 14/489,324, filed Dec. 3, 2015, 2 pp.

* cited by examiner

400

| GROUP | LEAF NODE # | t | P-VALUE |
|---|---|---|---|
| HIGH | 308 | 28.36 | <0.00001 |
| LOW | 314 | -2.63 | 0.00880 |
|  | 318 | -5.44 | <0.00001 |
|  | 320 | -14.17 | <0.00001 |

| GROUP | LEAF NODE # | MODIFIED z |
|---|---|---|
| UNUSUALLY HIGH | 308 | 4.67 |
| UNUSUALLY LOW | NONE | N/A |

FIG. 4B

DECISION TREE INSIGHT DISCOVERY

TECHNICAL FIELD

The disclosure relates to discovering certain insights into decision trees and presenting such insights.

BACKGROUND

A decision tree is a decision analysis tool that uses a tree-like model of decisions and possible consequences to predict the value of a target based on a set of predictor variables. Because a decision tree does not require as many model assumptions compared to traditional parametric models and because it is easy to interpret and understand, it is a popular data mining tool for classification and prediction in business analytics.

A decision tree may include a root node connected to one or more interior nodes that in turn are connected to one or more leaf nodes. The leaf nodes of a decision tree can represent a segment of the data such that the leaf nodes provide a distribution of a target variable. The segments of data are defined by the values of the predictors by the path from the root node to the leaf node. A path from a root node to a leaf node can be considered a rule or customer profile, and the entire decision tree may represent a set of rules or a set of customer profiles.

Decision trees can be regression trees or classification trees. A regression tree may be used to predict the values of continuous target variable while a classification tree may be used to classify the values of categorical targets into target categories.

SUMMARY

In another aspect, the disclosure is directed to a method for presenting insights into a classification tree. The method may include performing a grouping analysis to group leaf nodes of a classification tree into a significant group and an insignificant group. The method may further include performing influential target category analysis to identify one or more influential target categories for the leaf nodes of the classification tree in the significant group. The method may further include presenting one or more insights into the classification tree based on the grouping analysis and the influential target category analysis.

In another aspect, the disclosure is directed to a computer system for presenting insights into a classification tree. The computing system may include one or more processors. The computing system may further include one or more computer-readable memories. The computing system may further include one or more computer-readable tangible storage devices. The computing system may further include program instructions stored on at least one of the one or more computer-readable tangible storage devices for execution by at least one of the one or more processors via at least one of the one or more computer-readable memories to: perform a grouping analysis to group leaf nodes of a classification tree into a significant group and an insignificant group; perform influential target category analysis to identify one or more influential target categories for the leaf nodes of the classification tree in the significant group; and present one or more insights into the classification tree based on the grouping analysis and the influential target category analysis.

In another aspect, the disclosure is directed to a computer program product for presenting insights into a classification tree, the computer program product comprising a computer readable storage medium having program code embodied therewith, the program code readable/executable by at least one processor to perform a method comprising: performing a grouping analysis to group leaf nodes of a classification tree into a significant group and an insignificant group; performing influential target category analysis to identify one or more influential target categories for the leaf nodes of the classification tree in the significant group; and presenting one or more insights into the classification tree based on the grouping analysis and the influential target category analysis.

In one aspect, the disclosure is directed to a method for presenting insights into a regression tree. The method may include performing a grouping analysis to group leaf nodes of a regression tree into a high group, a medium group, and a low group. The method may further include performing unusual node detection analysis to detect one or more outlier nodes in the high group and in the low group. The method may further include presenting one or more insights into the regression tree based on the grouping analysis and the unusual node detection analysis.

In another aspect, the disclosure is directed to a computer system for presenting insights into a regression tree. The computer system may include one or more processors. The computer system may further include one or more computer-readable memories. The computer system may further include one or more computer-readable tangible storage devices. The computer system may further include program instructions stored on at least one of the one or more computer-readable tangible storage devices for execution by at least one of the one or more processors via at least one of the one or more computer-readable memories to: perform a grouping analysis to group leaf nodes of a regression tree into a high group, a medium group, and a low group; perform unusual node detection analysis to detect one or more outlier nodes in the high group and in the low group; and present one or more insights into the regression tree based on the grouping analysis and the unusual node detection analysis.

In another aspect, the disclosure is directed to a computer program product for presenting insights into a regression tree, the computer program product comprising a computer readable storage medium having program code embodied therewith, the program code readable/executable by at least one processor to perform a method comprising: performing a grouping analysis to group leaf nodes of a regression tree into a high group, a medium group, and a low group; performing unusual node detection analysis to detect one or more outlier nodes in the high group and in the low group; and presenting one or more insights into the regression tree based on the grouping analysis and the unusual node detection analysis.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 4A and 4B illustrate insights of regression trees that may be presented according to some aspects of the disclosure.

DETAILED DESCRIPTION

In general, aspects of the disclosure are directed to identifying leaf nodes of a decision tree having target distributions that are significantly different from the distributions of the overall decision tree. After a decision tree is built, a tree diagram that graphically represents the decision tree as well as summary statistics for the tree may be output to indicate how the data is classified into different profiles and to allow a user to discover the differences amongst the leaf nodes of the decision tree. In some examples, it may be useful to identify which of the leaf nodes of a decision tree have target distributions that are significantly different from that of the overall decision tree. While it may be easy for a user to visually determine which leaf nodes of a simple classification tree are significantly different from the overall target distribution of the classification tree, such a visual determination may be much more difficult for the user if the decision tree is more complex, such as by having many (e.g., hundreds) leaf nodes and having three or more target categories. Thus, there is a need for a systematic and efficient technique to determine the leaf nodes of a decision tree that have different target distributions and other statistics from the root node of the classification tree and to present the result of such determination to the user.

Figure 1:
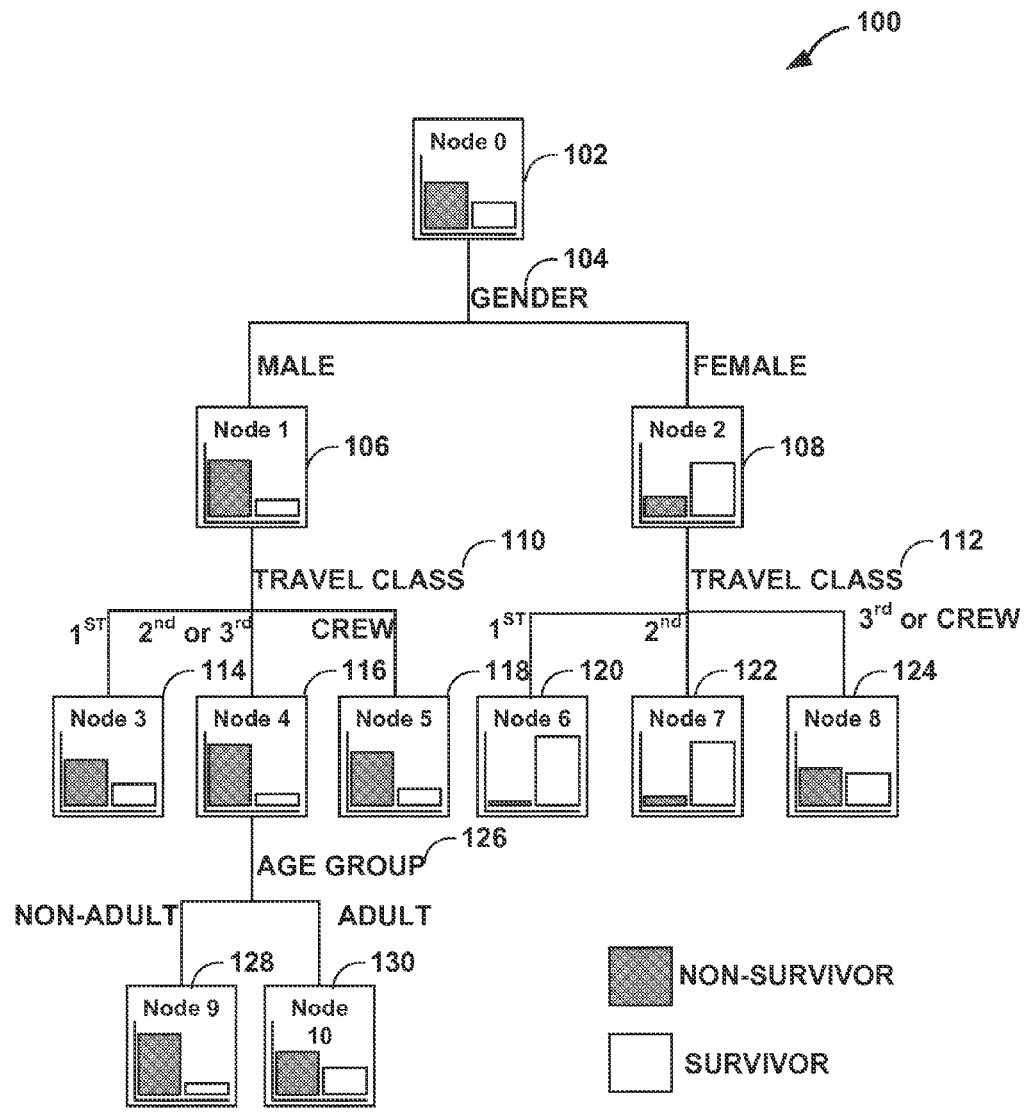
FIG. 1 is a block diagram illustrating a classification tree according to some aspects of the present disclosure.

FIG. 1 is a block diagram illustrating an example classification tree according to some aspects of the present disclosure. A classification tree may be used to predict membership of a target variable in one or more discrete classes based on one or more predictor variables. As shown in FIG. 1, classification tree 100 may predict the survival state of passengers, including crews, of the RMS Titanic. In the example shown in FIG. 1, the survival state of passengers may be the target variable for classification tree 100 and that target variable may fall into one of two target categories: non-survivor or survivor. Classification tree 100 is a classification tree and not a regression tree because classification tree 100 is used to group the dataset into discrete classes and that the target variable for classification tree 100 is categorical (i.e., either non-survivor or survivor) rather than continuous.

Classification tree 100 may be constructed based on records such as passenger profiles of the RMS Titanic. Each record may indicate whether that particular passenger survived or did not survive the sinking of the RMS Titanic, the gender of the passenger (female or male), the age group of the passenger (adult or non-adult), the class the passenger was traveling in (first, second, third, or crew), and the like. Root node 102 of classification tree 100 may be the topmost level node of classification tree 100 and may include predictions of the survival rate of passengers of the RMS Titanic without placing any conditions on the passengers. In the example shown in FIG. 1, classification tree 100 may be constructed based on 2047 passenger profiles, each of which includes information regarding whether the passenger survived the sinking of the RMS Titanic (i.e., whether the passenger was a survivor of the sinking or a non-survivor of the sinking). Root node 102 may show that 66.3% (1357/2047) of the passengers of the RMS Titanic did not survive the sinking of the RMS Titanic, while 33.7% (690/2047) of the passengers of the RMS Titanic did survive the sinking of the RMS Titanic.

Sub nodes of root node 102 may be determined by applying a split condition to root node 102. In the specific example shown in FIG. 1, split condition 104 may split the passengers by gender into male and female categories. Node 106 includes predictions regarding the survival rate of male passengers on the RMS Titanic based on the records of male passengers while node 108 may include predictions regarding the survival rate of non-male passengers on the RMS Titanic based on the records of non-male passengers. Node 106 may show that 1600 of the passenger profiles were that of male passengers, and that 77.1% (1233/1600) of the male passengers of the RMS Titanic did not survive the sinking of the RMS Titanic, while 22.9% (367/1600) of the male passengers of the RMS Titanic did survive the sinking of the RMS Titanic. Node 108 may show that 447 of the passenger profiles were that of female passengers, and that 27.7% (124/447) of the female passengers of the RMS Titanic did not survive the sinking of the RMS Titanic, while 72.3% (323/447) of the female passengers of the RMS Titanic did survive the sinking of the RMS Titanic. Additional split conditions may be applied to nodes 106 and 108. In the specific example shown in FIG. 1, split condition 110 may be applied to node 106 to split node 106 by travel class of the male passengers, and split condition 112 may be applied to node 108 to split node 108 by travel class of the female passengers. Applying split condition 110 to node 106 may result in node 114 that includes predictions regarding the survival rate of male passengers in first class on the RMS Titanic, node 116 that includes predictions regarding the survival rate of male passengers in second or third class on the RMS Titanic, and node 118 that includes predictions regarding the survival rate of the male crew on the RMS Titanic. Node 114 may show that 180 of the passenger profiles were that of male passengers in first class, and that 65.6% (118/180) of the male passengers in first class did not survive the sinking of the RMS Titanic, while 34.4% (62/180) of the male passengers in first class did survive the sinking of the RMS Titanic. Node 116 may show that 689 of the passenger profiles were that of male passengers in second or third class, and that 83.6% (576/689) of the male passengers in second or third class did not survive the sinking of the RMS Titanic, while 16.4% (113/689) of the male passengers in second or third class did survive the sinking of the RMS Titanic. Node 118 may show that 731 of the passenger profiles were that of male crews, and that 73.7% (539/731) of the male crews did not survive the sinking of the RMS Titanic, while 26.3% (192/731) of the male crews did survive the sinking of the RMS Titanic.

Correspondingly, applying split condition 112 to node 108 may result in node 120 that includes predictions regarding the survival rate of female passengers in first class on the RMS Titanic, node 122 that includes predictions regarding the survival rate of female passengers in second class on the RMS Titanic, and node 124 that includes predictions regarding the survival rate of female passengers in third class or crews on the RMS Titanic. Node 120 may show that 145 of the passenger profiles were that of female passengers in first class, and that 3.4% (5/145) of the female passengers in first class did not survive the sinking of the RMS Titanic, while 96.6% (140/145) of the female passengers in first class did survive the sinking of the RMS Titanic. Node 122 may show that 106 of the passenger profiles were that of female passengers in second class, and that 12.3% (13/106) of the female passengers in second class did not survive the sinking of the RMS Titanic, while 87.7% (93/106) of the female passengers in second class did survive the sinking of the RMS Titanic. Node 124 may show that 196 of the passenger profiles were that of female passengers in third class or crews, and that 54.1%

(106/196) of the female passengers in third class or crews did not survive the sinking of the RMS Titanic, while 45.9% (90/196) of the female passengers in third class or crews did survive the sinking of the RMS Titanic.

Furthermore, in the specific example shown in FIG. 1, split condition 126 may be applied to node 116 to split males passengers in second or third class on the RMS Titanic by age group, thereby resulting in node 128 that includes predictions regarding the survival rate of non-adult male passengers in second or third class on the RMS Titanic and node 130 that includes predictions regarding the survival rate of adult male passengers in second or third class on the RMS Titanic. Node 128 may show that 630 of the passenger profiles were that of non-adult male passengers in second or third class, and that 85.9% (541/630) of the non-adult male passengers in second or third class did not survive the sinking of the RMS Titanic, while 14.1% (89/630) of the non-adult male passengers in second or third class did survive the sinking of the RMS Titanic. Node 130 may show that 59 of the passenger profiles were that of adult male passengers in second or third class, and that 59.3% (35/59) of the adult male passengers in second or third class did not survive the sinking of the RMS Titanic, while 40.7% (24/59) of the adult male passengers in second or third class did survive the sinking of the RMS Titanic.

As shown in FIG. 1, nodes 114, 118, 120, 122, 124, 128, and 130 may be considered leaf nodes of classification tree 100 because those nodes do not have any sub nodes. In some examples, leaf nodes may also be known as terminal nodes. Classification tree 100, and more specifically leaf nodes of classification tree 100, may be analyzed to gain insight into the information presented by classification tree 100. For example, the leaf nodes of classification tree 100 may be analyzed to produce insights into which leaf nodes of classification tree 100 have a different target distribution from root node 102 of classification tree 100, and to produce insight into which target categories in each significant leaf node are having influential contributions to a statistically different target distribution from that of the root node 102.

Assuming that the overall target distribution of a classification tree is known and fixed, grouping analysis may be performed on the leaf nodes of classification tree 100 to group the leaf nodes into two groups: a significant group and an insignificant group. Leaf nodes may be grouped into the significant group if they have a statistically different target distribution than the overall distribution. The remaining leaf nodes of classification tree 100 may be grouped into the insignificant group.

To determine which leaf nodes of a classification tree are included in the significant group, Person's one-sample chi-squared test $\chi^2$ and the corresponding p-value may be computed for each leaf node i of the classification tree:

$$\chi_i^2 = \sum_{j=1}^{J} \frac{(N_{ij} - p_{\cdot j} \times N_i)^2}{p_{\cdot j} \times N_i}, \text{ and } p = 1 - Pr(\chi_{(J-1)}^2 \le \chi_i^2),$$

where $\chi_{(J-1)}^2$ is a random variable which follows a chi-squared distribution with (J−1) degrees of freedom, given a classification tree with target Y having J target categories denoted as $\{1, \ldots, J\}$ with M leaf nodes, where $N_i$ is the number of records for the $i^{th}$ leaf node, where i=1, ..., M, where $N_{ij}$ is the number of records in the $j^{th}$ target category for the $i^{th}$ leaf node, i=1, ..., M and j=1, ..., J, and where $p_{\cdot j}$ is the overall probability of the $j^{th}$ target category, j=1, ..., J.

For a leaf node in the classification tree, if its calculated p-value is smaller than $\alpha$, where $\alpha$ is defined as a significance level, then the leaf node has a statistically different distribution from the overall distribution and may be included in the significant group. Conversely, for a leaf node in the classification tree, if its calculated p-value is equal to or larger than $\alpha$, then the leaf node may be included in the insignificant group. In some examples, $\alpha$ may be about 0.05. In other examples, other values for $\alpha$, such as 0.10, may be used to change the determination of the significant leaf nodes.

Besides performing grouping analysis to group leaf nodes into a significant group and an insignificant group, influential target category analysis may also be performed to identify influential target categories for each leaf node in the significant group. An influential target category may be a category that has a statistically large percentage difference from that of the root node such that the target category may influence its leaf node into being grouped in the significant group.

To determine which target categories of leaf nodes in the significant group are influential, the chi-square statistic and the corresponding p-value may be calculated for each leaf node i∈G, where G denotes the significant group, for the $j^{th}$ target category, such that $$\chi_{ij}^2 = \frac{(N_{ij} - p_{\cdot j} \times N_i)^2}{N_i \times p_{\cdot j} \times (1 - p_{\cdot j})} \text{ and } p = 1 - Pr(\chi_1^2 \le \chi_{ij}^2),$$

where $\chi_1^2$ is a random variable which follows a chi-squared distribution with one degree of freedom. If p<$\alpha$*, where $\alpha$* is the significance level, then the $j^{th}$ target category is an influential target category for the leaf node i∈G. In some examples, $\alpha$* may be $\alpha$/J, where $\alpha$ is the significance level used in grouping analysis, based on the Bonferroni adjustment method.

For classification trees having two target categories, there may be no need to perform influential target category analysis to leaf nodes in the significant group, because the chi-squared statistics and corresponding p-values for grouping analysis may be the same as those for influential target category analysis. I.e., for each leaf node i in the significant group, $\chi_i^2 = \chi_{i1}^2 = \chi_{i2}^2$, and the corresponding p-values may be the same as they are all computed based on a chi-squared distribution with one degree of freedom. The difference for both analyses might be the significance level used in the tests. Thus influential target category analysis may not provide extra information for classification trees having two target categories and may be more useful for classification trees having three or more target categories.

Figure 2A:
FIGS. 2A and 2B illustrate insights of classification trees that may be presented according to some aspects of the disclosure.
Figure 2B:

FIGS. 2A and 2B illustrate insights of classification trees that may be presented according to some aspects of the disclosure. Such insights may be determined based on the grouping analysis and influential target category analysis discussed above with respect to FIG. 1. As shown in FIG. 2A, table 200 may present the results of a grouping analysis performed on a classification tree, such as classification tree 100 shown in FIG. 1, including presenting information regarding which nodes are included in the significant group. Table 200 may present the leaf nodes in the significant group along with its corresponding chi-square value and p-value, where each chi-square value has df=J−1. As shown in FIG. 2A, for classification tree 100, nodes 118, 120, 122, 124, and 128 may be presented in table 200 as being part of the significant group.

As shown in FIG. 2B, table 250 may present the results of an influential target category analysis performed on a classification tree, such as classification tree 100 shown in FIG. 1.

For example, table 250 may present information regarding the influential target categories along with its corresponding leaf node, chi-square value, and p-value, where each chi-square value has df=1. As shown in FIG. 2B, the influential target categories for classification tree 100 may be the non-survivor category and the survivor category for each of nodes 118, 120, 122, 124, and 128. As it has been mentioned, the chi-square values and p-values for two categories in the corresponding significant leaf node are the same in table 250 and also the same as those in table 200. Thus, table 250 in some examples may repeat that same information for classification tree 100 shown in FIG. 1.

Additionally, presenting insights into a classification tree may include presenting a graphical representation of the classification tree. In some examples, leaf nodes in the significant and insignificant groups may be highlighted in different colors. Similarly, influential target categories may also be highlighted in different colors or may be highlighted by, for example, a grow effect arrow to show the direction of influence, such as an up arrow if the influential target category is higher than expected, or a down arrow if the influential target category is lower than expected.

Figure 3:
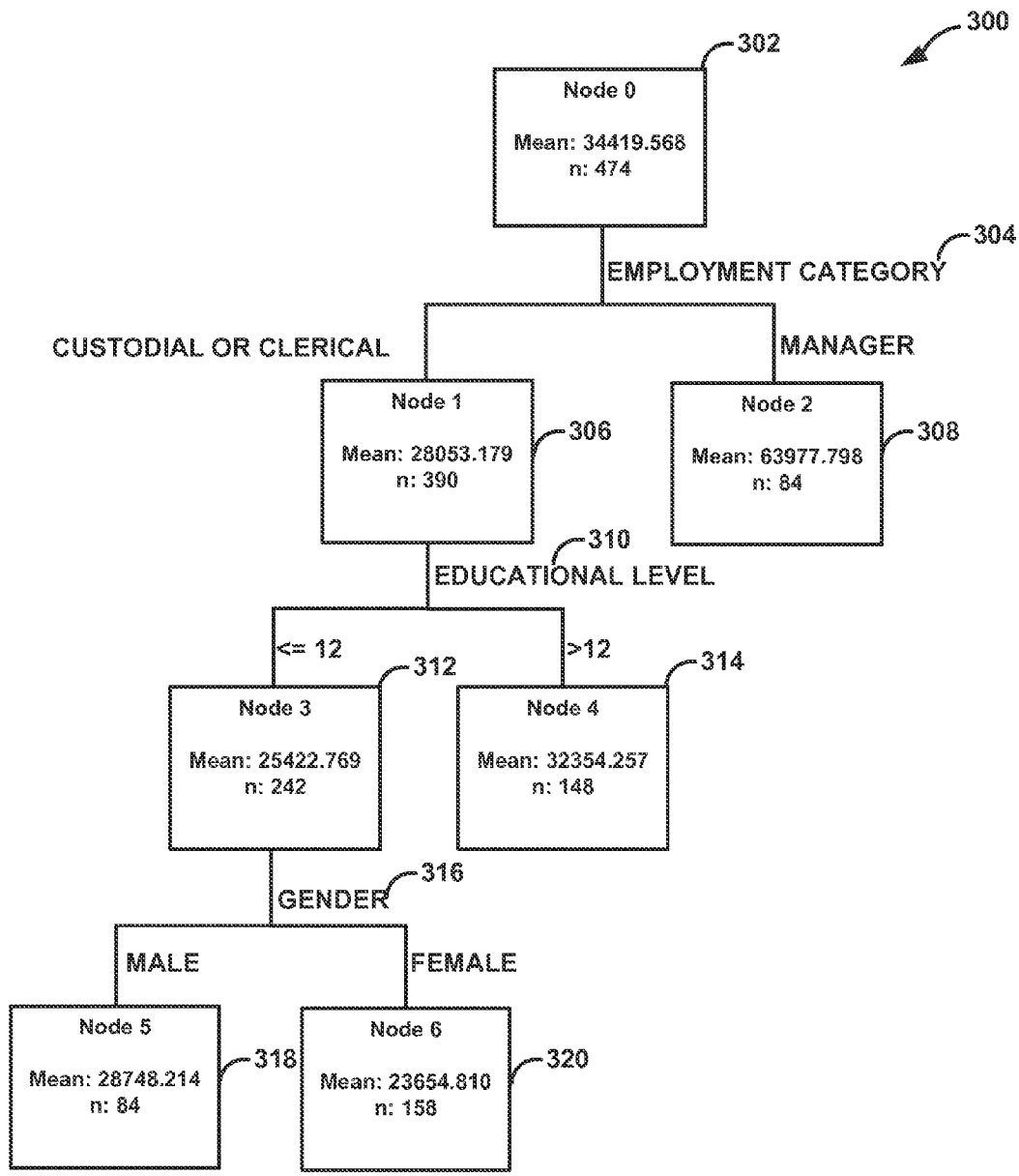
FIG. 3 is a block diagram illustrating an example regression tree according to some aspects of the present disclosure.

FIG. 3 is a block diagram illustrating an example regression tree according to some aspects of the present disclosure. A regression tree may be used to predict the value of an outcome where the value is considered a real number. As shown in FIG. 3, regression tree 300 may predict the current salary of an employee at a company. In the example shown in FIG. 3, the salary of an employee may be the target variable for regression tree 300. Regression tree 300 is a regression tree and not a classification tree because the target variable for regression tree 300 is continuous (i.e., a number) rather than categorical.

Regression tree 300 may be constructed based on records such as employee profiles of the company. Each record may indicate the current salary of that particular employee, the employment category of the employee (clerical, custodial, manager), the educational level of the employee (in years) (8, 12, 14-21), the gender of the employee (male or female), and the like. Root node 302 of regression tree 300 may be the topmost level node of regression tree 300 and may include predictions of the salary for an employee at the company in dollars. Regression tree 300 may be generated based on records of salaries of individual employees at the company. Thus, root node 302 may include a target mean (34419.568) of the salaries of 474 employees at the company used to generate the regression tree 300. Besides the mean salary, nodes of regression tree 300 may also include information regarding the number of records for the node, and the mean salary may be the predicted salary for each node. Sub nodes of root node 302 may be determined by applying a split condition to root node 302. In the specific example shown in FIG. 3, split condition 304 may split the employees based on whether they are working in a custodial or clerical position. Node 306 includes predictions regarding the salary of employees that do work in a custodial or clerical position while node 308 may include predictions regarding the salary of employees that do work in a manager position. As shown in FIG. 3, the target mean and predicted salary for employees as denoted in node 306 may be 28053.179, and the target mean and predicted salary for employees as denoted in node 308 may be 63977.798.

An additional split condition may be applied to node 306. In the specific example shown in FIG. 3, split condition 310 may be applied to node 306 to split node 306 based on the educational level of the employee. As shown in FIG. 3, the target mean and predicted salary for employees that work in a custodial or clerical position and that have an education level of $12^{th}$ grade or less may be 25422.769, while the target mean and predicted salary for employees that work in a custodial or clerical position and that have an education level of greater than $12^{th}$ grade may be 32354.257.

An additional split conditions may be applied to node 312. In the specific example shown in FIG. 3, split condition 316 may be applied to node 306 to split node 312 based on the gender of the employee. As shown in FIG. 3, the target mean and predicted salary for employees that work in a custodial or clerical position, that have an education level of $12^{th}$ grade or less, and that are males may be 28748.214, while the target mean and predicted salary for employees that work in a custodial or clerical position, that have an education level of $12^{th}$ grade or less, and that are females may be 23654.810.

As shown in FIG. 3, nodes 308, 314, 318 and 320 may be considered leaf nodes of regression tree 300 because those nodes do not have any sub nodes. In some examples, leaf nodes may also be known as terminal nodes. Regression tree 300, and more specifically leaf nodes of regression tree 300, may be analyzed to gain insight into the information presented by regression tree 300. For example, the leaf nodes of regression tree 300 may be analyzed to produce insights into which leaf nodes of regression tree 300 have a different target mean from root node 302 of regression tree 300, and to produce insight into outlier leaf nodes that are statistically unusually different from other leaf nodes.

Leaf nodes of regression tree 300 may be grouped into groups based on the difference between its target mean and root node 302's target mean. Given a regression tree built for target Y with M leaf nodes, and where $N_i$ is the number of records for the $i^{th}$ leaf node, i=1, . . . , M, $\bar{y}_i$ is the observed target mean for the $i^{th}$ leaf node, i=1, . . . , M, such that $$\bar{y}_i = \frac{1}{N_i}\sum_{k=1}^{N_i} y_{ik},$$

where $y_{ik}$ is the target value of the $k^{th}$ record in the $i^{th}$ leaf node, $s_i$ is the standard error of $\bar{y}_i$ for the $i^{th}$ leaf node, i=1, . . . , M, such that $$s_i = \sqrt{\frac{1}{N_i(N-M)}\sum_{i=1}^{M}\sum_{k=1}^{N_i}(y_{ik}-\bar{y}_i)^2},$$

where $N=\Sigma_{i=1}^{M} N_i$ is the total sample size, and $\bar{y}$ is the overall target mean (or the observed target mean) for the root node, such that $$\bar{y} = \frac{1}{N}\sum_{i=1}^{M}\sum_{k=1}^{N_i} y_{ik}.$$

The leaf nodes of a regression tree may be partition into a high group and a low group, such that leaf nodes in the high group may have target means that are statistically higher than the target mean for the root node and that leaf nodes in the low group may have target means that are statistically lower than the target mean for the root node. If any of the leaf nodes are not included in the high group or the low group, they may be included in a medium group. The leaf nodes of a regression tree may be sorted by their observed target means, $\bar{y}_1, \ldots, \bar{y}_M$, in descending order, so that we may assume without loss of generality that $\bar{y}_1 \geq \ldots \geq \bar{y}_M$. A one-sample t-test for the leaf node with the largest target mean (i.e., $\bar{y}_1$) may be conducted with a null hypothesis of $H_0$: $\bar{y}_1 = \bar{y}$ versus an alternative hypothesis of $H_A$: $\bar{y}_1 > \bar{y}$. The t statistic and its corresponding p-value may be $$t = \frac{\bar{y}_1 - \bar{y}}{s_1} \text{ and } p = 1 - \text{Prob}(t_{(N-M)} \leq t),$$

where $t_{(N-M)}$ is a random variable which following at distribution with (N−M) degrees of freedom. Since the standard errors of observed target means are computed based on a model-based method for the more robust test results, the degrees of freedom may be the same for all t-tests.

If p<α, where α is a significance level for the leaf node with the largest target mean ($\bar{y}_1$), then that leaf node may be included in the high group. If $\bar{y}_1$ is included in the high group, the same test may be repeated for the leaf node with the next highest target mean ($\bar{y}_2$) out of the leaf nodes, and then repeated for the leaf node with the next highest target mean ($\bar{y}_3$), and so on, until no more leaf nodes can be added to the high group because p≥α.

Similarly, a one-sample t-test for the leaf node with the smallest target mean (i.e., $\bar{y}_M$) with a null hypothesis of $H_0$: $\bar{y}_M = \bar{y}$ versus an alternative hypothesis of $H_A$: $\bar{y}_M < \bar{y}$. The t statistic and its corresponding p-value may be $$t = \frac{\bar{y}_M - \bar{y}}{s_M} \text{ and } p = 1 - \text{Prob}(t_{(N-M)} \leq t).$$

If p<α, where α is a significance level for the leaf node with the smallest target mean ($\bar{y}_M$), then the low group is formed by including the leaf node with the smallest target mean ($\bar{y}_M$). If $\bar{y}_M$ is included in the low group, the same test may be repeated for the leaf node with the next lowest target mean ($\bar{y}_{M-1}$), and then repeated for the leaf node with the next lowest target mean ($\bar{y}_{M-2}$), and so on until no more leaf nodes can be added to the lowest group because p≥α. Remaining leaf nodes of the regression tree that are not grouped into either the high group or the low group may be grouped into a medium group. In some examples, significance level α may be 0.05. In other examples, significance level α may be 0.1 or another suitable value.

Outlier nodes in the high and low groups of a regression tree may also be detected. An outlier node may be a node that differs markedly from others in the group. Such nodes may be detected by calculating a modified z-score for each node in the high and low groups. Given that a median MED of M target means $\bar{y}_1, \ldots, \bar{y}_M$ incorporating the number of records in each leaf node may be denoted as MED=median($\bar{y}_1, \ldots, \bar{y}_1, \ldots, \bar{y}_M, \ldots \bar{y}_M$), a median absolute deviation (MAD) of M target means incorporating the number of records in each leaf node may be denoted as MAD=median($|\bar{y}_1-\text{MED}|, \ldots, |\bar{y}_1-\text{MED}|, \ldots, |\bar{y}_M-\text{MED}|, \ldots, |\bar{y}_M-\text{MED}|$), the modified z-score for the $i^{th}$ leaf node, i=1, ..., M, may be computed such that $$z_i = \frac{\bar{y}_i - MED}{1.4826 \times MAD} \quad \text{if } MAD \neq 0, \text{ and}$$

-continued $$z_i = \frac{\bar{y}_i - MED}{1.2533 \times MeanAD} \quad \text{if } MAD = 0,$$

where MeanAD is mean absolute deviation and defined as $$MeanAD = \frac{1}{N} \sum_{i=1}^{M} N_i |\bar{y}_i - MED|.$$

If $z_i>3$, meaning that the target mean for leaf node i is more than three standard deviations from the median of all target means, MED, under the normality assumption, then the leaf node i may have an unusually high target mean in the high group. Conversely, if $z_i<-3$, also meaning that the target mean for leaf node i is more than three standard deviations from the median of all target means, then the leaf node i may have an unusually low target mean in the low group. Based on determining the modified z-scores, a list of unusual nodes in the high and low groups may be determined.

FIGS. 4A and 4B illustrate insights of regression trees that may be presented according to some aspects of the disclosure. Such insights may be determined based on the grouping analysis and unusual node analysis discussed above with respect to FIG. 3. As shown in FIG. 4A, table 400 may present the results of a grouping analysis performed on a regression tree, such as regression tree 300 shown in FIG. 3, including presenting information regarding which nodes are included in the high group and the low group. For each node in the high and low groups, table 400 may present the calculated t-statistic of the node, where each t-statistic has df=N−M, as well as the p-value of the node. In the example of regression tree 300, based on the data regarding the leaf nodes of regression tree 300, leaf node 308 may be presented in table 400 as being part of the high group while leaf nodes 314, 318, and 320 may be presented in table 400 as being part of the low group.

As shown in FIG. 4B, table 450 may present the results of an unusual node analysis performed on a regression tree, such as regression tree 300 shown in FIG. 3. For example, table 450 may present information regarding which nodes are unusually high and unusually low, and may present the modified z-score for those unusually high and unusually low nodes. In the example of regression tree 300, based on the data regarding the leaf nodes of regression tree 300, leaf node 308 may be presented in table 450 as being unusually high.

Additionally, presenting insights into a regression tree may include presenting a graphical representation of the regression tree. In some examples, leaf nodes in the high and low groups may be highlighted in different colors. Similarly, unusually high and unusually low leaf nodes may also be highlighted in different colors.

Figure 5:
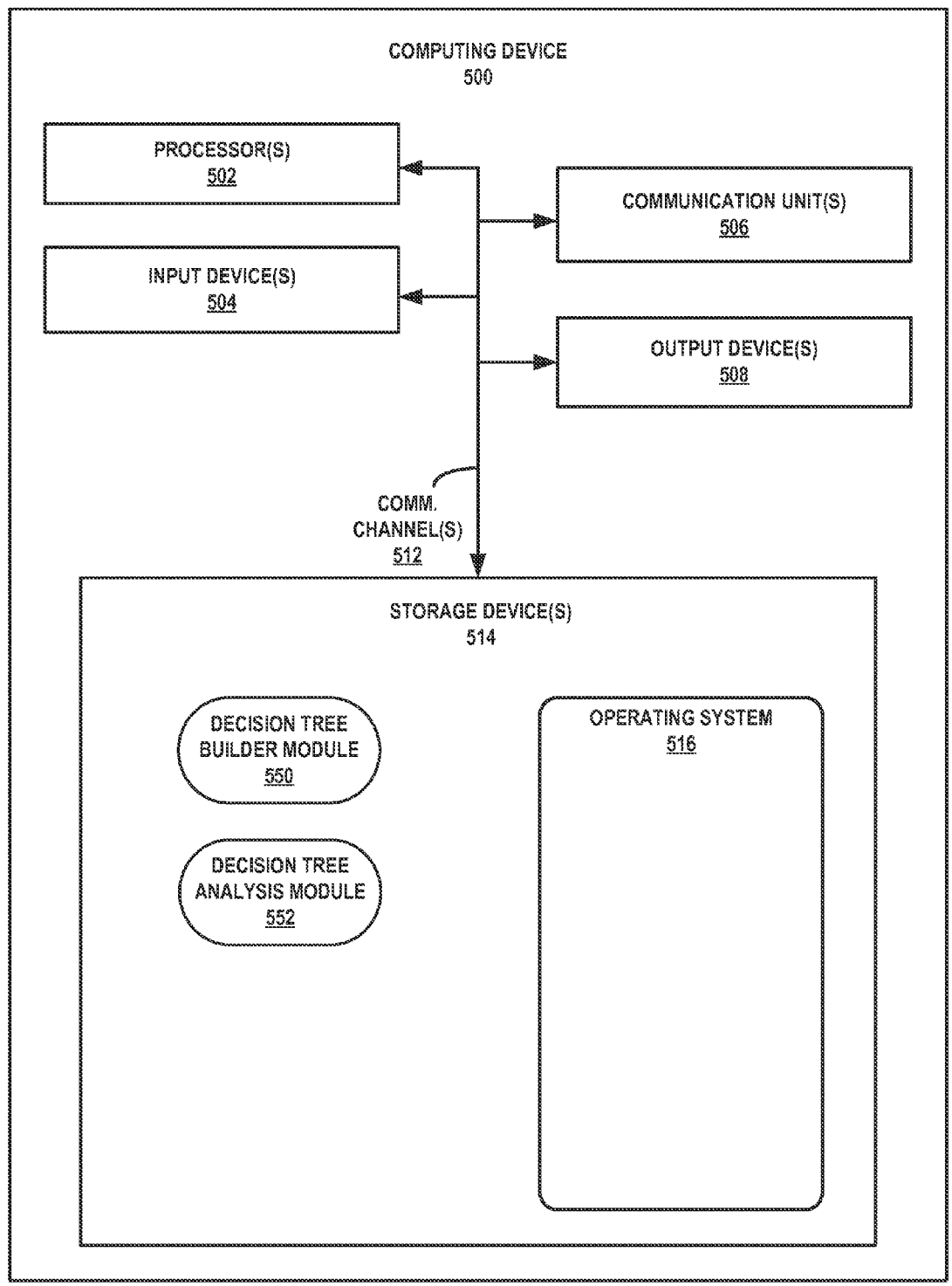
FIG. 5 is a block diagram illustrating a computing system according to some aspects of the present disclosure.

FIG. 5 is a block diagram illustrating a computing system according to some aspects of the present disclosure. Computing system 500 may be one example of a computing system that performs the grouping analysis and influential target category analysis for classification tree 100, presents the results of the grouping analysis and the influential target category analysis, performs the grouping analysis and the unusual node detection analysis for regression tree 300, and presents the results of the grouping analysis and the unusual node detection analysis. In other examples, computing device 500 can include fewer, additional, or different components compared to those illustrated in FIG. 5. As shown in the example of FIG. 5, computing device 500 may include one or more processors 502, one or more input devices 504, one or more communication units 506, one or more output devices 508, and one or more storage devices 514. In this example, storage devices 514 of computing device 500 may include operating system 516, decision tree builder module 550, and decision tree analysis module 552. Communication channels 512 may interconnect each of the components 502, 504, 506, 508, and 514 for inter-component communications (physically, communicatively, and/or operatively). In some examples, communication channels 512 may include a system bus, a network connection, an inter-process communication data structure, or any other method for communicating data.

One or more input devices 504 of computing device 500 may receive input. Examples of input are tactile, audio, and video input. Input devices 504 of computing device 500, in one example, include a presence-sensitive display, touch-sensitive screen, mouse, keyboard, voice responsive system, video camera, microphone or any other type of device for detecting input from a human or machine.

One or more output devices 508 of computing device 500 may generate output. Examples of output are tactile, audio, and video output. Output devices 508 of computing device 500, in one example, include a presence-sensitive display, sound card, video graphics adapter card, speaker, cathode ray tube (CRT) monitor, liquid crystal display (LCD), or any other type of device for generating output to a human or machine.

One or more communication units 506 of computing device 500 may communicate with wired or wireless external devices via one or more networks by transmitting and/or receiving network signals on the one or more networks. For example, computing device 500 may use communication units 506 to transmit and/or receive radio signals on a radio network such as a cellular radio network. Likewise, communication units 506 may transmit and/or receive satellite signals on a satellite network such as a GPS network. Examples of communication units 506 include a network interface card (e.g. such as an Ethernet card), an optical transceiver, a radio frequency transceiver, a GPS receiver, or any other type of device that can send and/or receive information. Other examples of communication units 506 may include Bluetooth®, GPS, 3G, 4G, and Wi-Fi® radios found in mobile devices as well as Universal Serial Bus (USB) controllers.

One or more storage devices 514 within computing device 500 may store information required for use during operation of computing device 500. Storage devices 514, in some examples, have the primary purpose of being short term and not long-term computer-readable storage mediums. Storage devices 514 on computing device 500 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 514 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 514 may store program instructions and/or data associated with decision tree builder module 550 and decision tree analysis module 552.

One or more processors 502 may implement functionality and/or execute instructions within computing device 500. For example, processors 502 on computing device 500 may read and execute instructions stored by storage devices 514 that execute the functionality of decision tree builder module 550 and decision tree analysis module 552. These instructions executed by processors 502 may cause computing device 500 to store information within storage devices 514 during program execution. Processors 502 may execute modules 550 and 552 to perform various actions.

Decision tree generation module 550 may generate decision trees including classification trees and regression trees. Decision tree analysis module 552 may analyze the decision trees generated by 550 and may provide insights regarding the analyzed decision trees. For example, if decision tree analysis module 552 analyzes a classification tree, such as classification tree 100 shown in FIG. 1, decision tree analysis module 552 may perform grouping analysis to group the leaf nodes of the classification tree into a significant group and an insignificant group. The significant group may include leaf nodes that have a statistically different target distribution from the overall distribution of the classification tree, while the insignificant group may include the rest of the leaf nodes in the classification tree that are not included in the significant group. Decision tree analysis module 552 may also perform influential target category analysis for each leaf node in the significant group to identify target categories that have statistically large percentage difference from those in root node such that the target categories may influence its leaf node into being grouped in the significant group.

Decision tree analysis module 552 may further present the results of the grouping analysis and the influential target category analysis, such as by outputting the results via output devices 508.

If decision tree analysis module 552 analyzes a regression tree, such as regression tree 300 shown in FIG. 3, decision tree analysis module 552 may perform grouping analysis to group the leaf nodes of the regression tree in to a high group and a low group. Leaf nodes having a target mean that is statistically higher than the overall mean of the regression tree may be grouped in the high group. Leaf nodes having a target mean that is statistically lower than the overall mean of the regression tree may be grouped in the low group. The remaining leaf nodes may be grouped into a middle group. Decision tree analysis module 552 may also perform unusual node detection analysis for leaf nodes in the high group and leaf nodes in the low group to detect outlier nodes in those groups that have an unusually high target mean in the high group or an unusually low target mean in the low group. Decision tree analysis module 552 may further present the results of the grouping analysis and the unusual node detection analysis, such as by outputting the results via output devices 508.

Figure 6:
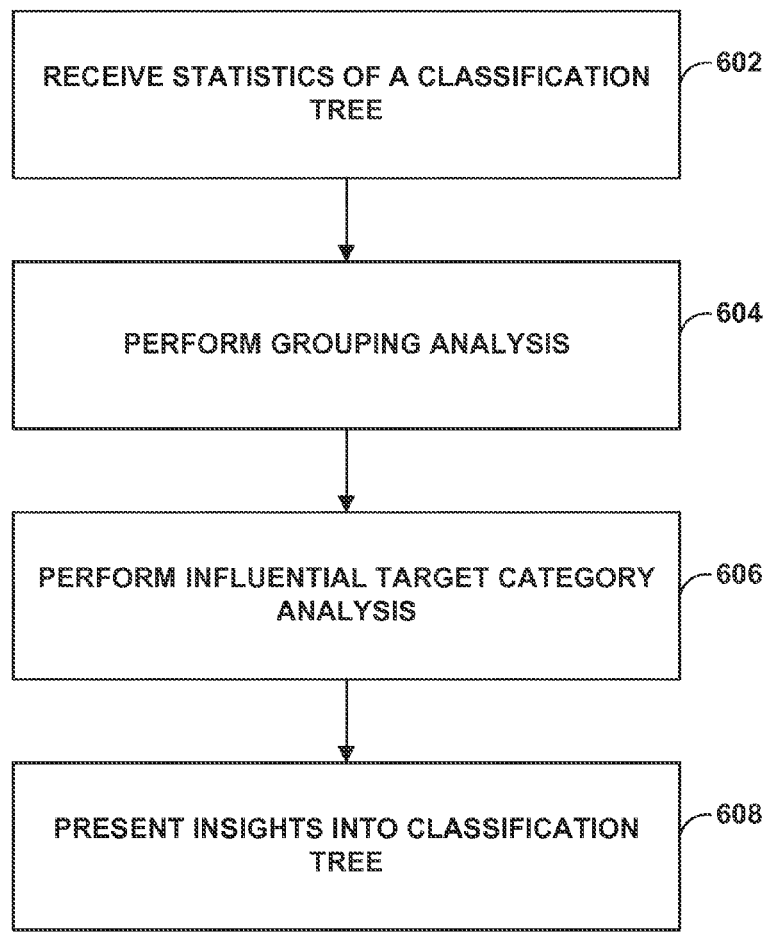
FIG. 6 is a flowchart illustrating an example process for providing insight into a classification tree according to some aspects of the disclosure

FIG. 6 is a flowchart illustrating an example process for providing insight into a classification tree, such as classification tree 100 shown in FIG. 1, according to some aspects of the disclosure. Such a process may be performed by a computing device or system, such as computing device 500 shown in FIG. 5. As shown in FIG. 6, a computing device may receive the statistics of a classification tree (602). Computing device may perform grouping analysis on the classification tree (604). Computing device may perform influential target category analysis on the classification tree (606). Computing device may present insights regarding the classification tree (608).

In some examples, performing grouping analysis on the classification tree may include computing a Person's one sample chi-squared statistic and corresponding p-value for each leaf node in the classification tree, grouping a leaf node in the decision tree into a significant group if the corresponding p-value for the leaf node is less than a specified significance level, and grouping the leaf node in the decision tree into an insignificant group if the corresponding p-value for the leaf node is more than or equal to a specified significance level.

In some examples, performing influential target category analysis may further include computing a chi-squared statistic and a corresponding p-value for target categories of leaf nodes in a significant group and determining that a target category for a leaf node in the significant group is an influential target category for the leaf node if the corresponding p-value of the target category is less than a specified significance level.

Figure 7:
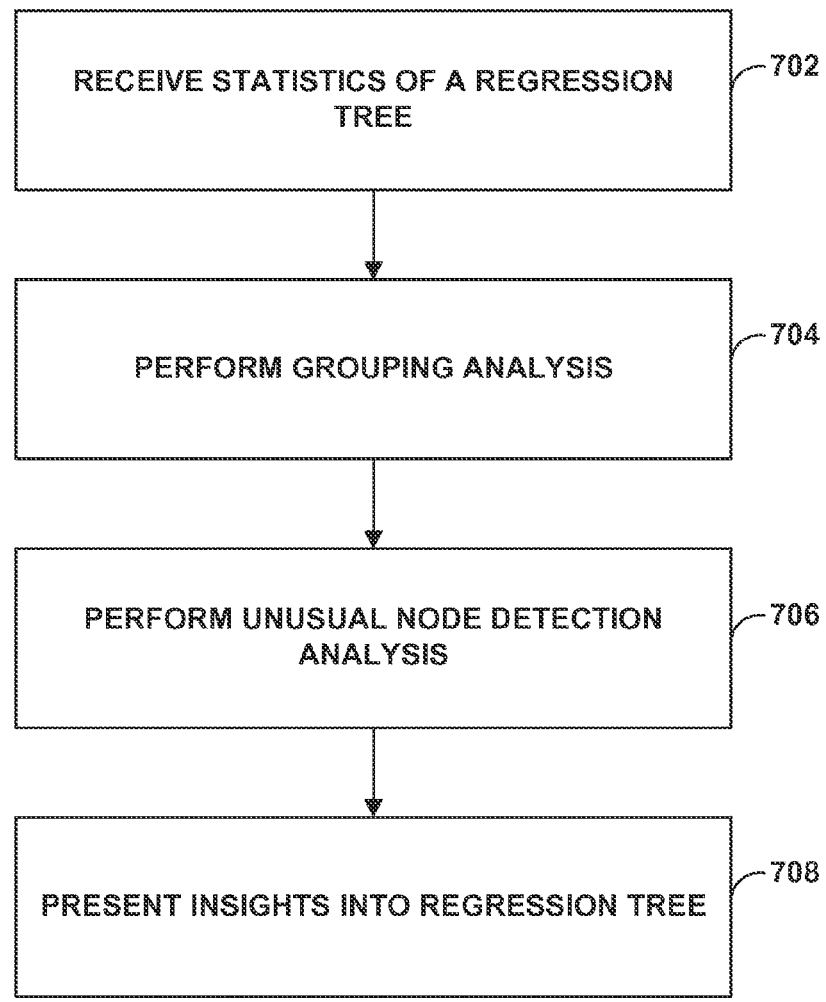
FIG. 7 is a flowchart illustrating an example process for providing insight into a regression tree according to some aspects of the disclosure

In some examples, presenting insights regarding the classification tree may further include outputting a graphical representation of the classification tree, graphically highlighting one or more leaf nodes in one or more of the significant group and the insignificant group in the graphical representation of the classification tree, and graphically highlighting the one or more influential target categories in the graphical representation of the classification tree. In some examples, presenting one or more insights into the classification tree may further include outputting a list of leaf nodes in the significant group and a list of leaf nodes in the insignificant group and outputting a list of the one or more influential target categories FIG. 7 is a flowchart illustrating an example process for providing insight into a regression tree, such as regression tree 300 shown in FIG. 3. Such a process may be performed by a computing device or system, such as computing device 500 shown in FIG. 5. As shown in FIG. 7, a computing device may receive statistics of a regression tree (702). Computing device may perform grouping analysis on the regression tree (704). Computing device may perform unusual node detection analysis on the regression tree (706). Computing device may present insights regarding the regression tree (708).

Performing grouping analysis on the regression tree may include grouping leaf nodes into a high group, a low group, and a middle group. To perform the grouping analysis on the regression tree, the computing device may determine a target mean and a standard error for each leaf node in the regression tree. The computing device may also determine the target mean for the root node of the regression tree. The computing device may sort the leaf nodes of the regression tree by target means in descending order from the leaf node with the largest target mean to the leaf node with the smallest target mean.

To form the high group of leaf nodes, computing device may perform a one-sample t-test for the leaf node with the highest target mean against the target mean for the root node to determine a t-statistic and a corresponding p-value for the leaf node. Computing device may group into the high group the leaf node having the largest target mean not grouped into the high group if the corresponding p-value is less than a specified significance level. Computing device may iteratively repeat performing the one-sample t-test and the grouping until the corresponding p-value for the leaf node having the largest target mean not grouped into the high group is greater than or equal to the specified significance level.

Similarly, to form the low group of leaf nodes, computing device may perform a one-sample t-test for the leaf node with the smallest target mean against the target mean for the root node to determine a t-statistic and a corresponding p-value for the leaf node. Computing device may group into the low group the leaf node having the smallest target mean not grouped into the low group if the corresponding p-value is less than a specified significance level. Computing device may iteratively repeat performing the one-sample t-test and the grouping until the corresponding p-value for the leaf node having the smallest target mean not grouped into the low group is greater than or equal to the specified significance level. Computing device may form the middle group by including in the middle group any leaf nodes that are not grouped in the high group or in the low group.

Performing unusual node detection analysis may include determining a number of records and a target mean for each leaf node in the regression tree. Performing unusual node detection analysis may further include determining a median and a median absolute deviation of the target mean in the leaf nodes based on the number of records. Performing unusual node detection analysis may further include determining a modified z-score for each leaf node. Performing unusual node detection analysis may further include detecting one or more unusual leaf nodes by comparing the modified z-score for each leaf node with a threshold value. In some examples, detecting the one or more unusual leaf nodes may further include determining that a leaf node is an unusual leaf node if the modified z-score for the leaf node is larger than three or if the modified z-score for the leaf node is smaller than negative three. In some examples, performing unusual node detection analysis may further include grouping the leaf node in an unusually high group if the modified z-score for the leaf node is greater than three and grouping the leaf node in an unusually low group if the modified z-score for the leaf node is less than negative three.

In some examples, presenting one or more insights into the regression tree may include outputting a graphical representation of the regression tree. Presenting one or more insights into the regression tree may further include graphically highlighting one or more leaf nodes in one or more of the high group and the low group in the graphical representation of the regression tree. Presenting one or more insights into the regression tree may further include graphically highlighting the one or more outlier nodes in the graphical representation of the regression tree.

In some examples, presenting one or more insights into the regression tree may include outputting a list of leaf nodes in the high group and a list of leaf nodes in the low group. Presenting one or more insights into the regression tree may also include outputting a list of the one or more outlier nodes.

As will be appreciated by one skilled in the art, aspects of the present disclosure may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific examples of algorithms are described herein for determining and presenting insights into regression trees and classification trees, it should be understood that any other suitable algorithms may be used to determine and present insights into regression trees and classification trees. Various aspects of the disclosure have been described. These and other aspects are within the scope of the following claims.

The invention claimed is:

1. A computer system for presenting insights into a classification tree, the computer system comprising:
   one or more processors;
   one or more computer-readable memories;
   one or more computer-readable tangible storage devices;
   program instructions stored on at least one of the one or more computer-readable tangible storage devices for execution by at least one of the one or more processors via at least one of the one or more computer-readable memories to:
      perform a grouping analysis to group leaf nodes of a classification tree into a significant group and an insignificant group;
      perform influential target category analysis to identify one or more influential target categories for the leaf nodes of the classification tree in the significant group; and
      present one or more insights into the classification tree based on the grouping analysis and the influential target category analysis.

2. The computer system of claim 1, wherein perform grouping analysis further comprises:
   compute a Person's one sample chi-squared statistic and corresponding p-value for each leaf node in the classification tree;
   group a leaf node in the decision tree into a significant group if the corresponding p-value for the leaf node is less than a specified significance level; and
   group the leaf node in the decision tree into an insignificant group if the corresponding p-value for the leaf node is more than or equal to a specified significance level.

3. The computer system of claim 1, wherein perform influential target category analysis further comprises:
   compute a chi-squared statistic and a corresponding p-value for target categories of leaf nodes in a significant group; and determine that a target category for a leaf node in the significant group is an influential target category for the leaf node if the corresponding p-value of the target category is less than a specified significance level.

4. The computer system of claim 1, wherein present one or more insights into the classification tree comprises:
output a graphical representation of the classification tree; and
graphically highlight one or more leaf nodes in one or more of the significant group and the insignificant group in the graphical representation of the classification tree; and
graphically highlight the one or more influential target categories in the graphical representation of the classification tree for each leaf node in the significant group.

5. The computer system of claim 1, wherein present one or more insights into the classification tree comprises:
output a list of leaf nodes in the significant group and a list of leaf nodes in the insignificant group; and
output a list of the one or more influential target categories.

6. A computer program product for presenting insights into a classification tree, the computer program product comprising a computer readable storage medium having program code embodied therewith, the program code readable/executable by at least one processor to perform a method comprising:
performing a grouping analysis to group leaf nodes of a classification tree into a significant group and an insignificant group;
performing influential target category analysis to identify one or more influential target categories for the leaf nodes of the classification tree in the significant group; and
presenting one or more insights into the classification tree based on the grouping analysis and the influential target category analysis.

7. The computer program product of claim 6, wherein performing grouping analysis further comprises:
computing a Person's one sample chi-squared statistic and corresponding p-value for each leaf node in the classification tree;
grouping a leaf node in the decision tree into a significant group if the corresponding p-value for the leaf node is less than a specified significance level; and
grouping the leaf node in the decision tree into an insignificant group if the corresponding p-value for the leaf node is more than or equal to a specified significance level.

8. The computer program product of claim 6, wherein performing influential target category analysis further comprises:
computing a chi-squared statistic and a corresponding p-value for target categories of leaf nodes in a significant group; and
determining that a target category for a leaf node in the significant group is an influential target category for the leaf node if the corresponding p-value of the target category is less than a specified significance level.

9. The computer program product of claim 6, wherein presenting one or more insights into the classification tree comprises:
outputting a graphical representation of the classification tree; and
graphically highlighting one or more leaf nodes in one or more of the significant group and the insignificant group in the graphical representation of the classification tree; and
graphically highlighting the one or more influential target categories in the graphical representation of the classification tree.

10. The computer program product of claim 6, wherein presenting one or more insights into the classification tree comprises:
outputting a list of leaf nodes in the significant group and a list of leaf nodes in the insignificant group; and
outputting a list of the one or more influential target categories for each leaf node in the significant group.

11. A computer system for presenting insights into a regression tree, the computer system comprising:
one or more processors;
one or more computer-readable memories;
one or more computer-readable tangible storage devices;
program instructions stored on at least one of the one or more computer-readable tangible storage devices for execution by at least one of the one or more processors via at least one of the one or more computer-readable memories to:
perform a grouping analysis to group leaf nodes of a regression tree into a high group and a low group;
perform unusual node detection analysis to detect one or more outlier nodes in the high group and in the low group; and
present one or more insights into the regression tree based on the grouping analysis and the unusual node detection analysis.

12. The computer system of claim 11, wherein perform the grouping analysis further comprises:
determine a target mean and a standard error for each leaf node of the regression tree and a target mean for a root node for the regression tree;
form the high group by:
perform a one-sample t-test for a leaf node having a largest target mean not grouped into the high group against the target mean for the root node to determine a t-statistic and a corresponding p-value,
group into the high group the leaf node having the largest target mean not grouped into the high group if the corresponding p-value for the leaf node having the largest target mean not grouped into the high group is less than a specified significance level, and
iteratively repeat the perform the one-sample t-test for the leaf node having the largest target mean not grouped into the high group and the group into the high group until the p-value for the leaf node having the largest target mean not grouped into the high group is greater than or equal to the specified significance level; and
form the low group by:
perform the one-sample t-test for a leaf node having a smallest target mean not grouped into the low group against the target mean for the root node to determine a t-statistic and a corresponding p-value,
group into the low group the leaf node having the smallest target mean not grouped into the low group if a corresponding p-value for the leaf node having the smallest target mean not grouped into the low group is less than a specified significance level, and
iteratively repeat the perform the one-sample t-test for the leaf node having the smallest target mean not grouped into the low group and the group into the low group until the p-value for the leaf node having the smallest target mean not grouped into the low group is greater than or equal to the specified significance level.

13. The computer system of claim 11, wherein perform the unusual node detection analysis further comprises:
- determine a number of records and a target mean for each leaf node in the high group and in the low group;
- determine a median and a median absolute deviation of the target mean in the leaf nodes based on the number of records;
- determine a modified z-score for each leaf node; and
- detect one or more unusual leaf nodes by comparing the modified z-score for each leaf node with a threshold value.

14. The computer system of claim 13, wherein detect the one or more unusual leaf nodes further comprises:
- detect that a leaf node is an unusual leaf node if the modified z-score for the leaf node is greater than three or if the modified z-score is less than negative three.

15. The computer system of claim 14, further comprising:
- group the leaf node in an unusually high group if the modified z-score for the leaf node is greater than three; and
- group the leaf node in an unusually low group if the modified z-score for the leaf node is less than negative three.

16. The computer system of claim 11, wherein present one or more insights into the regression tree comprises:
- output a graphical representation of the regression tree; and
- graphically highlight one or more leaf nodes in one or more of the high group and the low group in the graphical representation of the regression tree; and
- graphically highlight the one or more outlier nodes in the graphical representation of the regression tree.

17. The computer system of claim 11, wherein present one or more insights into the regression tree comprises:
- output a list of leaf nodes in the high group and a list of leaf nodes in the low group; and
- output a list of the one or more outlier nodes.

18. A computer program product for presenting insights into a regression tree, the computer program product comprising a computer readable storage medium having program code embodied therewith, the program code readable/executable by at least one processor to perform a method comprising:
- performing a grouping analysis to group leaf nodes of a regression tree into a high group and a low group;
- performing unusual node detection analysis to detect one or more outlier nodes in the high group and in the low group; and
- presenting one or more insights into the regression tree based on the grouping analysis and the unusual node detection analysis.

19. The computer program product of claim 18, wherein performing the grouping analysis further comprises:
- determining a target mean and a standard error for each leaf node of the regression tree and a target mean for a root node for the regression tree;
- forming the high group by:
    - performing a one-sample t-test for a leaf node having a largest target mean not grouped into the high group against the target mean for the root node to determine a t-statistic and a corresponding p-value,
    - grouping into the high group the leaf node having the largest target mean not grouped into the high group into the high group if the corresponding p-value for the leaf node having the largest target mean not grouped into the high group is less than a specified significance level, and
    - iteratively repeating performing the one-sample t-test and the grouping until the p-value for the leaf node having the largest target mean not grouped into the high group is greater than or equal to the specified significance level; and
- forming the low group by:
    - performing the one-sample t-test for a leaf node having a smallest target mean not grouped into the low group against the target mean for the root node to determine a t-statistic and a corresponding p-value,
    - grouping into the low group the leaf node having the smallest target mean not grouped into the low group if a corresponding p-value for the leaf node having the smallest target mean not grouped into the low group is less than a specified significance level, and
    - iteratively repeating performing the one-sample t-test and the grouping into the low group until the p-value for the leaf node having the smallest target mean not grouped into the low group is greater than or equal to the specified significance level.

20. The computer program product of claim 18, wherein performing the unusual node detection analysis further comprises:
- determining a number of records and a target mean for each leaf node in the high group and in the low group;
- determining a median and a median absolute deviation of the target mean in the leaf nodes based on the number of records;
- determining a modified z-score for each leaf node; and
- detecting one or more unusual leaf nodes by comparing the modified z-score for each leaf node with a threshold value.

21. The computer program product of claim 20, wherein detecting the one or more unusual leaf nodes further comprises:
- determining that a leaf node is an unusual leaf node if the modified z-score for the leaf node is greater than three or if the modified z-score is less than negative three.

22. The computer program product of claim 21, wherein detecting the one or more unusual leaf nodes further comprises:
- grouping the leaf node in an unusually high group if the modified z-score for the leaf node is greater than three; and
- grouping the leaf node in an unusually low group if the modified z-score for the leaf node is less than negative three.

23. The computer program product of claim 18, wherein presenting one or more insights into the regression tree comprises:
- outputting a graphical representation of the regression tree; and
- graphically highlighting one or more leaf nodes in one or more of the high group and the low group in the graphical representation of the regression tree; and
- graphically highlighting the one or more outlier nodes in the graphical representation of the regression tree.

24. The computer program product of claim 18, wherein presenting one or more insights into the regression tree comprises:
- outputting a list of leaf nodes in the high group and a list of leaf nodes in the low group; and
- outputting a list of the one or more outlier nodes.

* * * * *